US012735027B1

(12) United States Patent
Johnston et al.

(10) Patent No.: US 12,735,027 B1
(45) Date of Patent: Sep. 15, 2026

(54) OBJECT CORNER DETECTION

(71) Applicant: Zoox, Inc., Foster City, CA (US)

(72) Inventors: Douglas Vernon Johnston, San Francisco, CA (US); Yueqi Li, Foster City, CA (US); Allan Zelener, San Mateo, CA (US); Qiang Zhai, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 162 days.

(21) Appl. No.: 18/675,687

(22) Filed: May 28, 2024

(51) Int. Cl.

| | |
|---|---|
| ***G06V 10/44*** | (2022.01) |
| ***B60W 30/09*** | (2012.01) |
| ***B60W 30/095*** | (2012.01) |
| ***B60W 50/00*** | (2006.01) |
| ***G06V 20/56*** | (2022.01) |

(52) U.S. Cl.

CPC ........ *B60W 30/09* (2013.01); *B60W 30/0956* (2013.01); *B60W 50/0097* (2013.01); *G06V 10/44* (2022.01); *G06V 20/56* (2022.01); *B60W 2554/402* (2020.02); *B60W 2554/4045* (2020.02)

(58) Field of Classification Search

CPC ............. B60W 30/09; B60W 30/0956; B60W 50/0097; B60W 2554/402; B60W 2554/4045; G06V 10/44; G06V 20/56

See application file for complete search history.

(56) References Cited

U.S. PATENT DOCUMENTS

| | | | | |
|---|---|---|---|---|
| 11,113,873 B1 * | 9/2021 | Bosse | G06T 19/20 |
| 12,136,229 B1 * | 11/2024 | Liu | B60W 60/001 |
| 12,136,269 B1 * | 11/2024 | Besson | G06V 20/58 |
| 12,437,548 B1 * | 10/2025 | Dowdall | G06V 20/56 |
| 2021/0046940 A1 * | 2/2021 | Feser | G01B 11/24 |
| 2022/0204029 A1 * | 6/2022 | Chen | G01S 17/42 |
| 2022/0222480 A1 * | 7/2022 | Jiang | G06N 3/0464 |
| 2023/0266773 A1 * | 8/2023 | Ding | G05D 1/43 701/1 |
| 2024/0193786 A1 * | 6/2024 | Kim | G06T 7/73 |

FOREIGN PATENT DOCUMENTS

| | | | |
|---|---|---|---|
| CN | 111079859 A * | 4/2020 | G06F 18/2321 |
| DE | 102022206860 A1 * | 1/2024 | G06T 7/80 |

* cited by examiner

*Primary Examiner* — Daniel M. Robert
(74) *Attorney, Agent, or Firm* — Lee & Hayes, P.C.

(57) ABSTRACT

Techniques for determining detection boxes representing objects in an environment using improved corner detections are disclosed herein. Autonomous vehicle sensors can capture data in an environment that may include separate objects, such as large and/or articulated vehicles. In an example, the data can include a plurality of points that may be processed to identify object corners. Locations of points in clusters of points associated with particular object corners may be aggregated to determine a predicted corner point that may be used to adjust the detection box for that object, thereby generating a more accurate detection box for the object. A vehicle computing system can control the vehicle using the adjusted detection box.

20 Claims, 5 Drawing Sheets

OBJECT CORNER DETECTION

BACKGROUND

Various systems are utilized by autonomous vehicles to guide such autonomous vehicles through environments including around various static and dynamic objects. For instance, a vehicle computing system may generate one or more trajectories to guide autonomous vehicles through areas with other moving vehicles (autonomous or otherwise), moving people, stationary buildings, etc. A variety of sensors may be used to collect information about objects in the surrounding environment, which may be used by the vehicle computing system to determine physical parameters of such objects within the environment, such as dimensions, geometry, boundaries, position, yaw, etc. This information may be used to generate detection boxes and/or other representations of physical objects in the environment that may then be used to control the vehicle to safely travel in the environment. Accurately determining the physical parameters of objects in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
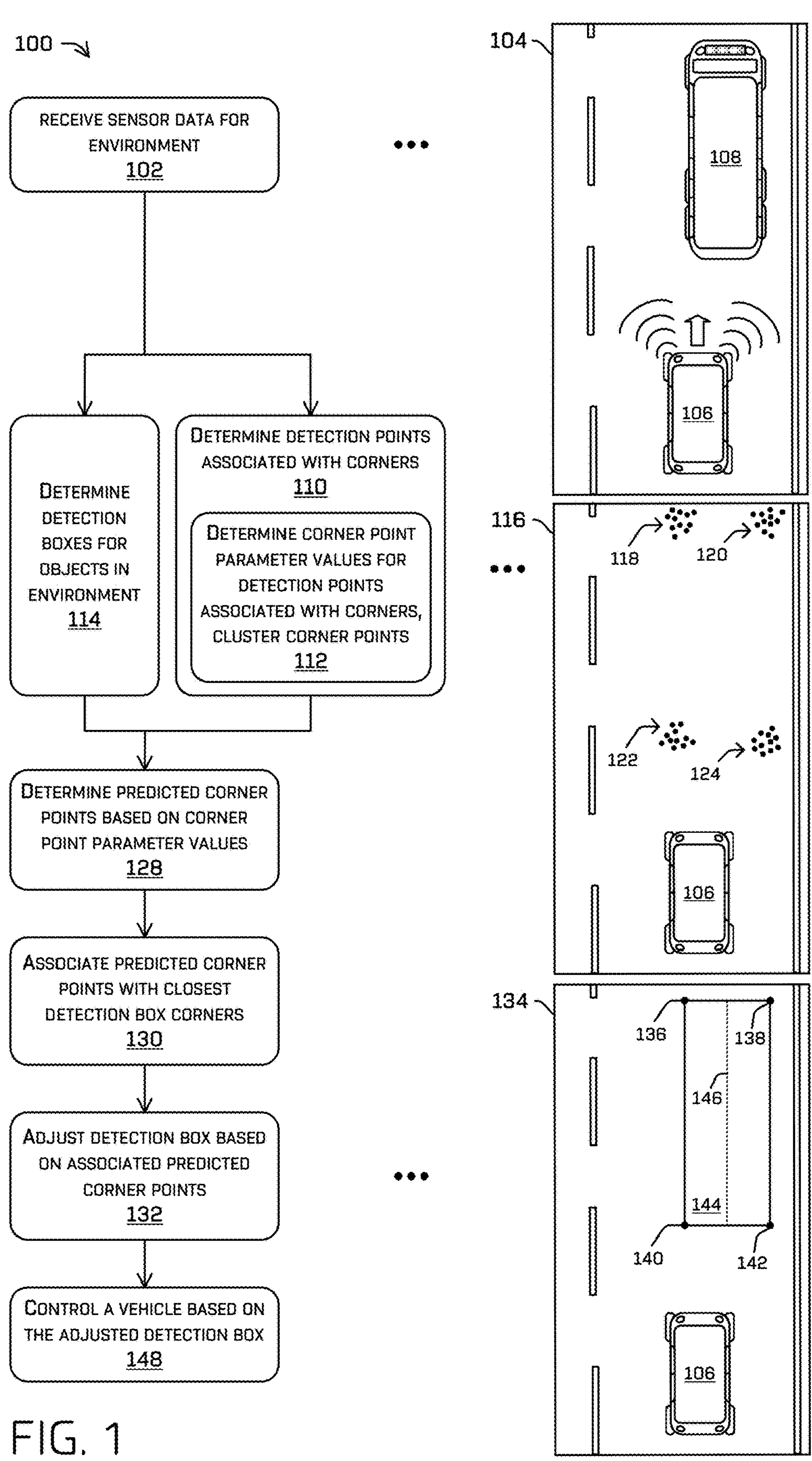
FIG. 1 is a pictorial flow diagram of an example process for generating detection boxes using systems and methods for corner detections, in accordance with examples of the disclosure.

Techniques for determining detection boxes and/or representations for representing objects in an environment using corner detection techniques are discussed herein. While the disclosed techniques may be used to determine detection boxes and/or representations for objects of any size and/or shape, in various examples, the disclosed techniques may be used to determine detection boxes for large objects. A large object can include an articulated vehicle (e.g., tractor-trailer, bus, etc.) and/or a vehicle that is greater than a threshold length (e.g., 15 feet, 20 feet, 10 meters, etc.), width, and/or overall size. In conventional object detection systems, a vehicle computing system may create a single large bounding box or representation to represent a large vehicle (e.g., bus, semi-tractor-trailer, etc.) or two or more detection boxes or representations to represent an articulated object. As described herein, an articulated object may be an object consisting of two or more portions that may independently move, such as a combination of a truck and a trailer (e.g., a tractor-trailer). A "detection box" as used herein may include any two-dimensional or three-dimensional data representation of an object in an environment. As will be appreciated, it may be difficult for a vehicle computing system configured at a first vehicle (e.g., an autonomous passenger vehicle) to acquire sufficient data (e.g., sensor data) to determine an accurate detection box for a second vehicle because the visibility to the second vehicle may be limited (e.g., there may not be full sensor access to the entirety of the second vehicle).

In examples, sensors of an autonomous vehicle may capture sensor data and/or other data that may be used to determine a representation of an environment, which may include objects separate from the autonomous vehicle, such as other vehicles or pedestrians. A two-dimensional image representing the environment from a top-down perspective may be generated based at least in part on the sensor data. Image data for such an image may include pixel data associated with specific pixels in the image. The pixel data can be used to determine detection boxes representing objects in the environment. The autonomous vehicle may then use such detection boxes to safely navigate through the environment.

Alternatively or additionally, sensors of an autonomous vehicle may capture sensor data and/or other environmental data (e.g., data representing aspects of an environment that may or may not be based on sensor data) that may be "voxelized" by uniformly dividing the space into three-dimensional cubes ("voxels") representing sections of that portion of the space to generate a three-dimensional representation of the space in the environment. The data associated with the individual sensor detection points (e.g., lidar points, radar points, sonar points, image points, etc.) within individual voxels may be used to generate a three-dimensional voxel data structure representing the environment. In examples, sensor data and/or other data associated with portions of an environment may be "voxelized" by uniformly dividing the space into three-dimensional cubes ("voxels") representing sections of that portion of the space. The data associated with the individual sensor points and/or other data units within individual voxels may be aggregated to generate single, representative data values for such individual voxels that may then be used in the operations as described herein. This aggregated sensor point data may be referred to as "voxelized sensor point data." Note that a "detection box" as used herein may also refer to a voxel data structure and any data and/or operations associated with pixels described herein may also be applicable to voxels.

Because an autonomous vehicle may be collecting sensor data and other types of data in an environment from a particular position and location, portions of the environment may be obscured from sensors configured at the vehicle. For example, some types of sensors configured at an autonomous vehicle may require line-of-sight visibility to a surface in order to detect the surface. For instance, these types of sensors may not be able to directly collect sensor data for surfaces beyond a rear portion of a large truck that may be located directly in front of the autonomous vehicle.

The autonomous vehicle may be configured with a vehicle computing system that may include one or more object detection components that may be configured to determine detection boxes for objects in the environment, such as the large truck positioned in front of the vehicle. The object detection component(s) may rely on sensor data and/or other data representing the environment to generate detection boxes and other detection data that may be used by other components of the vehicle computing system to operate the vehicle within the environment. However, because the sensor data and/or other data representing the environment may be inaccurate or incomplete (e.g., due to a lack of full sensor access to portions of objects, such as the portions of the large truck obscured by the back of the truck), the resulting detection boxes may be inaccurate. Using inaccurate detection boxes to operate the vehicle in an environment may result in a reduction of the safety and/or passenger comfort during operation of the vehicle.

The disclosed object detection systems and methods may address deficiencies in current detection box determinations with the disclosed techniques for corner detection that may determine a more accurate corner point for a detection box or other representation of an object. These more accurate corner points may then be used as a basis for determining a more accurate detection box for an object in an environment by refining a detection box representing the object.

In various examples, sensor data may be captured by a vehicle computing system configured at a vehicle traversing an environment. Such a vehicle may be configured with one or more sensor systems (lidar, radar, sonar, cameras, time-of-flight, etc.). These sensor systems may include emitters configured to emit electromagnetic radiation (e.g., light, sound, lasers, etc.) or other types of emissions into an environment and/or detect electromagnetic radiation and/or other emissions present in the environment (e.g., reflected from surfaces in the environment and/or emitted from objects in the environment). These sensor systems may generate or otherwise determine sensor data based on the detected emissions in the environment and provide this sensor data to the vehicle computing system. Sensor data may, in some examples, include point data representing discrete points at particular locations in the environment. Point data may include location data (e.g., in two or three dimensions) for the associated point in the environment as well as one or more other parameters associated with that point. For example, a lidar point cloud representing the environment may be generated or otherwise determined at a vehicle computing system based on lidar sensor data collected via lidar sensors configured at the vehicle. Individual points of the lidar point cloud may include data indicating a location of the point in two- or three-dimensional environment space as well as various lidar-based measurements and/or other data that may be determined or obtained (e.g., based on lidar data and/or other types of (e.g., sensor) data) for the respective point. In another example, pixels of an image may include data representing a particular location in two-dimensional environment space (e.g., from a top-down perspective). Such pixel data may include location data as well as various other sensor-based measurements and/or other data that may be determined or obtained (e.g., based on sensor data and/or other types of data).

Using this data representing an environment, the vehicle computing system may determine or generate two-dimensional data, three-dimensional data, and/or scenes representing the environment. Such data representations may represent a portion of the environment as viewed or perceived from the point of view of a sensor. For example, an image may represent a picture of the environment as captured by a camera configured at the vehicle. However, any type of sensor data or combination of various types of sensor data may be used to generate one or more images or other data structures representing a portion of an environment captured from any perspective.

The data representing an environment may be processed by the vehicle computing system to detect objects, such as other vehicles, in the environment. For example, the vehicle computing system may determine the presence, location, extents (e.g., dimensions), classifications (e.g., object type determinations), and/or other properties of individual objects within the environment based on images and/or other data structures containing data representing the environment. In various examples, the vehicle computing system may include an object detection component that may be configured to perform such object detections, for example, based on processing individual data points in images and/or other data structures representing an environment. The object detection component may include one or more machine-learned models and/or other components configured to detect and classify objects in an environment, including determining object types, extents, locations, etc. These model(s) and/or other components may then be used, for example in conjunction with sensor and/or perception systems and/or other classification systems and/or components, to control the vehicle in the real-world environment in which the vehicle may be traveling.

In various examples, the object detection component (e.g., a corner point determination component configured at the object detection component) may be configured to identify one or more points in a data structure representing an environment that are sufficiently likely to be located at object corners ("corner points"). For example, the object detection component may determine one or more pixels in an image of an environment that have a sufficiently high probability of being at a corner of an object in the environment. The object detection component may also, or instead, be configured to determine one or more points (e.g., voxels, lidar points, etc.) in a data structure representing the environment in three dimensions (e.g., voxelized representation of the environment, a point cloud, etc.) that have a sufficiently high probability of being at a corner of an object in the environment.

The object detection component may be configured to determine corner point parameters for the individual pixels or points determined to be corner points. In examples, for an individual corner point, the object detection component may determine corner location parameters that indicate the relative location of an associated corner represented by the point with respect to the vehicle and/or the sensor(s) associated with the data structure representing the environment. The object detection component may further determine, or extract from point data, location coordinates (e.g., within a detected area or space) of corner points. For instance, the object detection component may determine a vertical corner location parameter (e.g., front or rear) and a horizontal corner location parameter (e.g., left or right) for a corner point, where such parameters indicate a corner location from a top-down perspective of the vehicle and/or one or more sensors. In examples, the object detection component may also, or instead, determine a height corner location parameter (e.g., top or bottom) for a corner point, where this parameter may indicate a corner location from a perspective of the vehicle and/or the sensor(s) in three-dimensional space. Note that these corner location parameters may be determined without association to a particular object (e.g., the corner point location parameters represent a likely corner point orientation of that point without association to any particular object).

For example, the object detection component may determine various parameters and/or attributes of an individual point and determine, based on such parameters and/or attributes, that the individual point is (e.g., likely to be) a corner point. In examples, the object detection component may include a machine-learned model trained to generate such corner points and/or corner point location parameters. Such a model may be executed using sensor data and/or environmental data as input to generate data representing corner points and/or corner point location parameters as output data, along with, in some examples, confidence information (e.g., confidence of classification as a corner point). Such a model may also be trained to determine a classification for corner points, such as an object classification for an object for which the corner point likely represents a corner (e.g., bus, truck, articulated vehicle, car, pedestrian, bicycle, etc.). This classification information may also be accompanied by confidence data. In other examples, classification of corner points and/or their associated objects may be performed by a separate classification model trained to perform and output object classifications (and associated confidence values).

In examples, a corner point classification model may be configured to output corner point data (e.g., only) for corner points likely to be associated with particular object classifications, such as large vehicles, articulated vehicles, buses, trucks, objects of greater than a threshold length, etc. Such a model may be configured to not determine and/or output data for corner points that are not associated with the corner point-associated objects, thereby conserving resources used in corner point determination operations.

The object detection component may be configured to cluster corner points associated with a same corner of an object in the environment. For example, the object detection component may determine, as points in a particular corner point cluster, those corner points having the same vertical corner location parameter and horizontal corner location parameter (and, in three-dimensional examples, the same height corner location parameter). For instance, the corner points having front and left corner location parameters (and, in examples, being sufficiently spatially proximate, e.g., having sufficiently similar location coordinates) may be associated with a particular cluster of corner points. Corner point clusters may be determined using other criteria as well, or instead. For example, clusters of corner points may be determined based on corner classification confidence (e.g., point in a cluster has a corner point classification confidence value above a threshold).

The object detection component may be configured to determine a predicted corner point using these clusters of corner points. In examples, the object detection component may determine an average location or weighted average location for the predicted corner point based on the locations of the individual corner points in an associated cluster of corner points. Locations of individual points may be relative to data structure locations (e.g., relative to a pixel center, relative to a voxel center, etc. indicated by, for example, offset relative to location of a pixel/voxel or pixel/voxel center) or otherwise represented in any effective manner.

For example, the object detection component may be configured to average the location coordinate values for each dimension for the individual corner points in a cluster to determine a predicted corner point location coordinate. For instance, the object detection component may average the vertical location coordinates (e.g., y axis) of the individual corner points in a cluster to determine a vertical location coordinate (e.g., y axis) for a predicted corner point and may average the horizontal location coordinates (e.g., x axis) of the individual corner points in a cluster to determine a horizontal location coordinate (e.g., x axis) for the predicted corner point. Similar operations may be performed for height corner location coordinates (e.g., z axis) in three-dimensional examples.

Using the predicted corner point location coordinates, the object detection component may associate the determined predicted corner points with a detection box associated with an object, the object detection component may be configured to determine detection boxes for the various objects detected within the environment (e.g., based on sensor data and/or other data, and independent of corner point determinations). The object detection component may identify a detection box that is (e.g., spatially) closest to a location of a predicted corner point (e.g., based on predicted corner point location coordinates) and associate that corner point with the detection box.

In examples, the object detection component may include a machine-learned model trained to determine boxes. Such a model may be executed using sensor data and/or environmental data as input to generate data representing detection boxes as output data, along with, in some examples, confidence, etc.). This classification information may also be accompanied by confidence data. In other examples, classification of objects and/or their associated detection boxes may be performed by a separate classification model trained to perform and output object classifications (and associated confidence values). Such models or other techniques may also be used regardless of having a complete set of "corners." As a non-limiting example, where sensor data is determined to be associated with only 1, 2, or 3 corners of an object, such models may, nonetheless, output a detection box (or other representation) identifying the object.

In examples, the location of a predicted corner point may not be the same as the location of a nearest edge or corner of a detection box. For example, the predicted corner point may be outside of the extents of the detection box closest to the point. Because the predicted corner point is likely to be an accurate determination of a corner of the detection box (e.g., more accurate than the corner determined with the detection box), the detection box may be adjusted or refined based on the predicted corner point. In some examples, a corner of the detection box (e.g., detection box corner coordinates) may be modified to have the same coordinates as the associated predicted corner point. In various examples, the detection box modification may be in any or all of the available dimensions (e.g., vertical, horizontal, and/or height). In other examples, the object detection component may be configured to adjust the detection box in a single dimension, such as vertically, based on determined predicted corner points.

In various examples, the object detection component may determine one or more overlapping or spatially proximate detection boxes that may be associated with a single object in the environment. For example, an articulated vehicle, such as a truck and trailer, may be associated with two detection boxes that may overlap or may otherwise be proximate to one another at their intersection (e.g., a detection box for the truck that overlaps or is close to a detection box for the trailer at the hitch connecting the truck and trailer). The area about such an overlap or proximity may be referred to as a "joint" or "joint area." Because the corners of the detection boxes that are within this section of overlapping or proximate detection boxes for a same object are not exterior corners of the object as a whole, these interior corners may not be used as object corners in detection boxes used to control the vehicle because they may not represent object corners that the vehicle may encounter in the environment. Therefore, to reduce resource utilization and improve computing efficiency, interior corner points associated with overlapping or proximate portions of multiple detection boxes for a same object may be filtered from or otherwise not used in the corner point processing operations described herein. The remaining exterior corner points (e.g., points not associated with overlapping portions of detection boxes) may be processed as described herein.

As noted, in various examples, one or more machine-learned models may be trained to perform the disclosed object detection aspects, including determining corner points (e.g., interior and exterior corner points), predicted corner points, detection boxes (e.g. independently of corner point determinations), detection box associations, and/or associated data. For example, a machine-learned model may be trained to determine individual corner points and corner point parameters that may then be clustered and/or averaged (e.g., by one or more downstream components) to determine a predicted corner point. The machine-learned model may also, or instead, be configured to determine detection boxes that may then be associated with predicted corner points (e.g., by one or more downstream components).

In various examples, one or more machine-learned models configured to determine corner points may be trained to exclude or filter interior corner points from use in determining predicted corner points. For example, such models may be trained with training data that excludes the use of corner points in portions of overlapping or proximate detection boxes for a same object in generating predicted corner points. In such examples, the machine-learned model of an object detection component may be trained to determine attributes or parameters of corner points indicating that such points are likely associated with overlapping or proximate detection boxes of a same object or otherwise are likely to be interior corner points. The model may then be trained to exclude interior corner points from its corner point data output. For example, corner point parameters and/or attributes may be used by such a model to determine that a particular corner point is likely to be an interior corner point or an exterior corner point (e.g., independent of any association with any particular detection box). The model may then remove interior points from model output based on this determination. In some examples, the object detection component may also, or instead, include operations to detect and remove interior corner points from use in predicted corner point determination using model corner point output data, thereby improving the conservation of resources by preventing the processing of corner point data.

Training data used to train such models may be sensor data and/or other data in data structures (images, other two-dimension data structures, three-dimensional data structures, etc.) accompanied by corner point determinations, corner point parameters, detections box determinations, detection box parameters, predicted corner point and detection box associations, and/or associated data. Such training data may be based on collected real-world sensor data and/or synthetic training data generated for training purposes.

The resulting detection boxes determined by an object detection component, as adjusted based on determined predicted corner points, may be provided to other components and systems of the vehicle computing device for use in various operations. For example, the resulting (e.g., adjusted) detection boxes may be used by one or more planning components and/or trajectory determination components of a vehicle computing system to determine a trajectory for use in controlling the vehicle through an environment. The resulting (e.g., adjusted) detection boxes may also, or instead, be used by one or more prediction components of a vehicle computing system to predict a trajectory for the objects associated with the detection boxes, which in turn may be used to more safely control the vehicle through an environment. In various examples, the resulting (e.g., adjusted) detection boxes may be integrated into and/or used to generate a two-dimensional (e.g., top-down) representation of the environment that may be passed as a data structure to one or more components of the vehicle computing system. In other examples, the resulting (e.g., adjusted) detection boxes may be integrated into and/or used to generate a (e.g., multichannel) data structure with three-dimensional data representing the environment.

The systems and techniques described herein may be directed to leveraging sensor data and other data to enable a vehicle, such as an autonomous vehicle, to more accurately determine objects and object parameters in an environment so that the vehicle may be more safely and efficiently operated in the environment, improving passenger comfort and safety. These improved detection boxes determined as described herein may facilitate safer navigation through an environment and improved vehicle control. In particular examples, the systems and techniques described herein can utilize data structures of various types containing data representing sensor data, object data, detection boxes, two-and/or three-dimensional representations of an environment, and/or any other associated data. By using the object determination techniques described herein to more accurately determine objects present in an environment with a vehicle, the examples described herein may result in increased safety and accuracy of vehicle control, especially vehicle operations proximate to such objects, thereby allowing an autonomous vehicle to more safely operate in an environment. For example, the techniques described herein may be faster and/or more robust than conventional techniques, as they may increase the ability of an autonomous vehicle to safely navigate in an environment and more smoothly implement operations to travel through the environment (which may, in turn, provide more comfortable rider experiences while ensuring safe operation of the vehicle). That is, techniques described herein provide a technological improvement over existing vehicle operation technology.

The techniques described herein may also improve the operation of computing systems and increase resource utilization efficiency. For example, computing systems, such as vehicle computing systems, may more efficiently perform vehicle control operations using the techniques described herein because the disclosed examples may reduce the amount of object-related data needed to generate trajectories and object predictions and reduce the amount of processing required to determine vehicle controls used for vehicle operation. For instance, by initially determining more accurate object detections using the disclosed techniques, a vehicle computing system may need to perform fewer recalculations to update detected objects and/or determine alternative vehicle controls based on subsequently determining that earlier detected objects are in a different location and/or have different extents than previously determined. The techniques disclosed herein further increase resource utilization efficiency by preemptively eliminating interior corner points from corner point processing operations and only performing such operations on vehicles where corner points determinations are likely to provide the greatest benefit (e.g., corner points-associated objects such as trucks, buses, other large vehicles, etc.). Furthermore, computing systems, such as vehicle computing systems, may more efficiently perform trajectory and vehicle control determination operations based on more accurate object data, thereby requiring less processing to determine updated trajectories and controls than would be required using conventional techniques where a trajectory and vehicles controls are generated based on less accurate object detections.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of trajectory and/or sensor data and processing with particular types of components, data and data structures as described herein can include any two-dimensional, three-dimensional, or multi-dimensional data and data associated with any types of trajectories and any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like), or any combination thereof.

Figure 3:
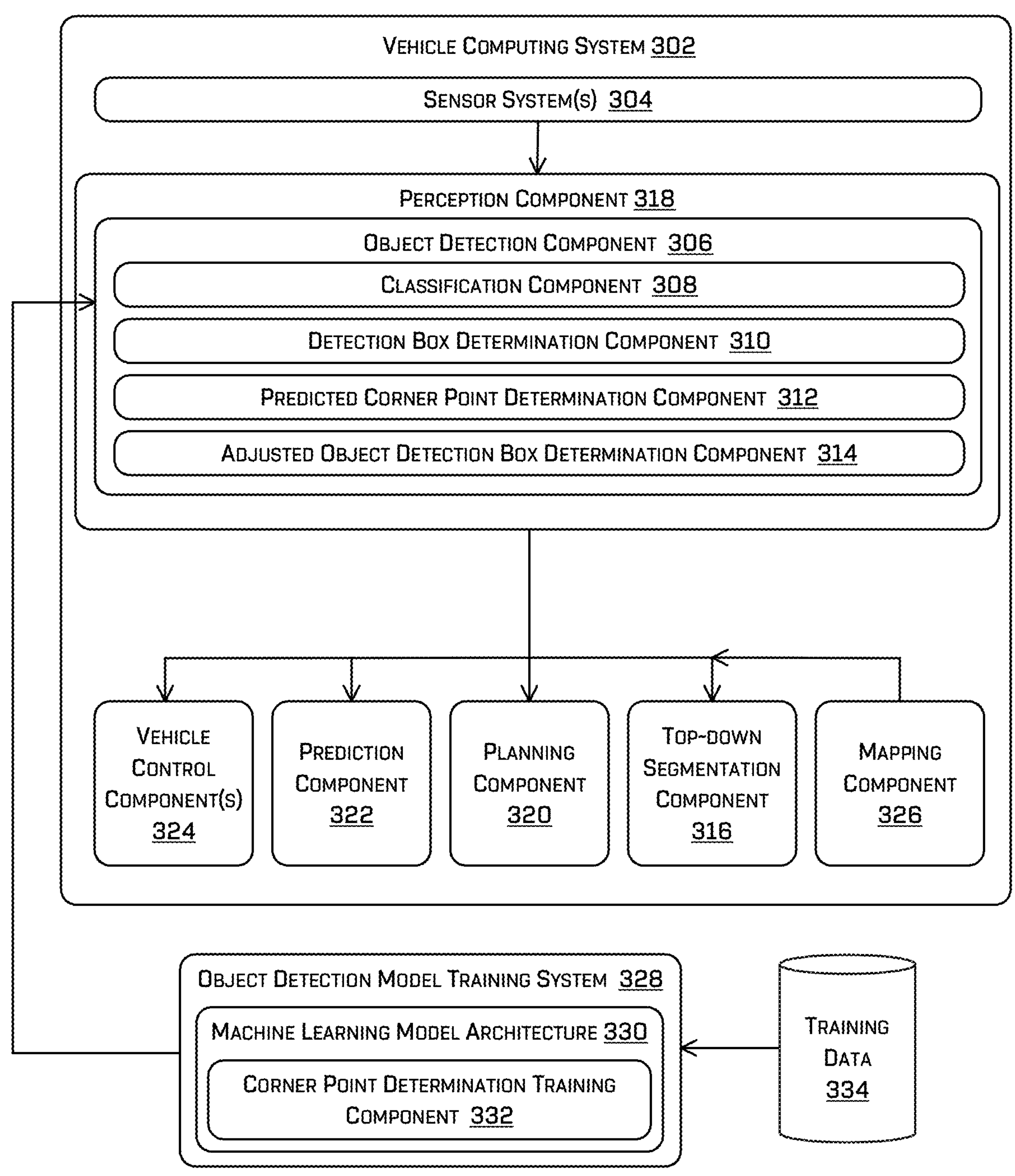
FIG. 3 depicts a block diagram of an example system for implementing the methods described herein.

FIG. 1 is a pictorial flow diagram of an example process 100 for object detection box determination. In examples, one or more operations of the process 100 may be implemented by a vehicle computing system, such as by using one or more of the components and systems illustrated in FIGS. 3-5 and described below. For example, the one or more components and systems can include an object detection component 306 illustrated in FIG. 3 and/or one or more components associated therewith. Alternatively or additionally, the one or more components and systems can include an object detection component 414 illustrated in FIG. 4 and/or one or more components associated therewith. Alternatively or additionally, the one or more components and systems can include an object detection component 532 and/or an object detection component 552 illustrated in FIG. 5 and/or one or more components associated therewith. However, the process 100 is not limited to being performed by such components and systems, and the components and systems of FIGS. 3 and 5 are not limited to performing the process 100.

At operation 102, sensor data representing an environment in which a vehicle may be traveling may be received at a vehicle computing system or other computing system. This sensor data may include one or more types of sensor data associated with one or more types of sensor systems, including, but not limited to, vision data associated with a vision system, lidar data associated with a lidar system, radar data associated with a radar system, sonar data associated with a sonar system, etc. In various examples, the sensor data may include or be represented in a two-dimensional representation of a portion of an environment determined based on sensor data and associated with a particular sensor perspective. For example, such two-dimensional representations may include images or scenes captured by a camera configured at a vehicle or otherwise based on sensor data collected by one or more sensors configured at the vehicle (e.g., a "two-dimensional sensor perspective image"). While referred to herein generally as "images," any two-dimensional representation of an environment described herein may be associated with any sensor perspective and may be generated or otherwise determined using any type of sensor data and/or any combination of multiple types of sensor data. In other examples, the sensor data may include or be represented in a three-dimensional representation of a portion of an environment determined based on sensor data and associated with a particular sensor perspective.

An example 104 illustrates a top-down view of a portion of an environment that may be represented by sensor data such as that received at operation 102. In the portion of the environment represented in example 104, a vehicle 106 may represent a vehicle associated with such sensor data (e.g., a vehicle that may have collected, generated, and/or received the sensor data) and that may be traveling through that portion of the environment. A vehicle 108 may also be within this portion of the environment. The vehicle 108 may be a large vehicle, such as a bus. The vehicle 106 may be equipped with a vehicle computing system that may include an object detection component as described herein.

At operation 110, the system (e.g., a vehicle computing system and/or an object detection component associated therewith) may determine detection points from among the sensor data and/or associated data received at operation 102 that may be associated with corners. In examples, the object detection component may be configured to identify and/or classify individual points (e.g., pixels, voxels, points in a point cloud, etc.) as corner points (e.g., as points with a sufficient likelihood of being at a location of a corner of an object). The system may further be configured to determine one or more classification confidence values and/or other values associated with a corner point classification. In examples, the object detection component may also be configured to identify and/or classify likely object represented by an individual corner point (e.g., bus, truck, etc.) and/or an interior and/or exterior point classification of such corner points. In some examples, those corner points that are not associated with a corner point-associated object and/or are associated with interior corner points may be removed from use in further corner point determination operations.

At operation 112, in examples as part of the corner point determination operation 110, the system (e.g., a vehicle computing system and/or an object detection component associated therewith) may determine values for corner point location coordinates and/or for one or more corner point parameters (e.g., relative corner location parameter values) associated with the corner points determined at operation 110. For example, the system may determine a vertical corner location parameter (e.g., front or rear) and/or a horizontal corner location parameter (e.g., left or right) for the individual corner points. In three-dimensional examples, the system may also, or instead, determine a height corner location parameter (e.g., top or bottom) for the individual corner points.

Based on the corner point parameters, further at operation 112, the system may determine clusters of corner points. For example, the system may cluster corner points that are associated with a same type of object, proximate to one another in space, have the same vertical corner location parameter, and/or have the same horizontal location parameter. In three-dimensional implementations, the system may further cluster corner points based that have the same height corner location parameter.

In examples, the system may filter out corner points from further corner point determination operations based on a total number of points in a cluster. This may remove corner points that have erroneously been determined based on sensor data noise, debris in the environment, reflections, distortions, etc. For example, if a corner point is associated with fewer than a threshold number (e.g., 5, 10, 25, 100, etc.) of other corner points (e.g., the number of points in its cluster is below a threshold), the corner point (and all corner points having the same parameters and associated detection box) may be removed from use in subsequent corner point determination operations.

At operation 114, in examples, in parallel with or otherwise independently from operations 110 and 112, the system (e.g., a vehicle computing system and/or an object detection component associated therewith) may determine object detection boxes for objects in the environment based on the data received at operation 102. Included in this operation may be a classification or other object type determination. For example, the system may be configured to determine that boxes are associated with particular vehicle or object types (e.g., bus object type, tractor-trailer object type, articulated vehicle object type, pedestrian object type, bicycle object type, motorcycle object type, etc.).

An example 116 illustrates a top-down view of the portion of the environment represented in the example 104. In the example 116, using sensor data collected in the environment, the system may have determined various corner points 118, 120, 122, and 124. The system may have further determined corner point parameters for these corner points. For example, the system may determine that a subset of the corner points 118, 120, 122, and 124, such as the corner points 118, may each have a vertical corner location parameter of "front" and a horizontal corner location parameter of "left." As described herein, these parameters may be determined from the perspective of the vehicle 106.

Similarly, the system may have determined that the corner points 120 may each have a vertical corner location parameter of "front" and a horizontal corner location parameter of "right." The system may have also determined that the corner points 122 may each have a vertical corner location parameter of "rear" and a horizontal corner location parameter of "left." The system may have further determined that the corner points 124 may each have a vertical corner location parameter of "rear" and a horizontal corner location parameter of "right."

Based on these corner point parameters, the system may cluster the corner points for use in subsequent corner point determination operations. For example, the corner points 118 may be clustered together based on each having a vertical corner location parameter of "front" and a horizontal corner location parameter of "left," the corner points 120 may be clustered together based on each having a vertical corner location parameter of "front" and a horizontal corner location parameter of "right," the corner points 122 may be clustered together based on each having a vertical corner location parameter of "rear" and a horizontal corner location parameter of "left," and the corner points 124 may be clustered together based on each having a vertical corner location parameter of "rear" and a horizontal corner location parameter of "right."

At operation 128, the system may determine predicted corner points by averaging location parameters (e.g., location coordinates for two or three dimensions) of the determined corner points in the same clusters. In examples, simple averaging may be used to determine a location parameter for each dimension. Alternatively, corner point parameters may be weighted using various factors, such as confidence associated with the initial classification of a point as a corner point (e.g., a higher weight may be assigned to corner points having a higher confidence value corner point classification). The averaged or otherwise final location parameters for each cluster may be used as the predicted corner point location parameters for the predicted corner point for that portion of the associated detection box.

The determined predicted corner points may be associated with a detection box at operation 130. For example, the system may determine the nearest detection box to the location of individual determined predicted corner points and associate the predicted corner points with the nearest corner of that detection box.

At operation 132, the system may adjust the detection box based on the determined predicted corner points. For example, the location parameters (e.g., two- or three-dimensional location coordinates) of the determined predicted corner points may differ from the location parameters of the corners of the associated detection box. Because the determined predicted corner points are likely to be more accurate than the determined corners of the detection box, the system may adjust the detection box to expand (or contract) in one or more dimensions to match the detection box corners to the locations of the corresponding predicted corner points. The system may adjust more than one corner of a detection box to retain the rectangular shape of the box, or the system may adjust the corners as needed, even if the resulting box is a non-rectangular polygon. Adjustment of the detection box may include modifying one or more parameters representing a size, shape, dimension, and or location of the decision box. For example, a detection box may include one or more extent parameters representing the (e.g., two- or three-dimensional) dimensions of the detection box. The system may modify at least one such extent parameter based on a location parameter of a predicted corner point.

An example 134 illustrates a top-down view of the portion of the environment represented in examples 104 and 116. In the example 134, the system may have determined predicted corner points 136, 138, 140, and 142, based on averaging location parameters of the corner points 118, 120, 122, and 124, respectively. Based on the locations of the predicted corner points 136, 138, 140, and 142, the system may have adjusted a nearest detection box to the predicted corner points to determine an adjusted detection box 144. For example, the system may have expanded the nearest detection box vertically (e.g., along the y axis 146) to generate the adjusted detection box 144 that now has corners meeting the locations of the predicted corner points 136, 138, 140, and 142.

At operation 148, the vehicle computing system may use the adjusted detection box to control the vehicle. For example, the object detection component may output the adjusted detection box to a planning component or a trajectory determination component for use in determining a trajectory and further movement of the vehicle through the environment. The object detection component may further, or instead, output the adjusted detection box to a prediction component for use in predicting the motion of the object associated with the adjusted detection box. The object detection component may also, or instead, output the adjusted detection box to one or more other components for use in controlling the vehicle and/or performing other operations.

Figure 2:
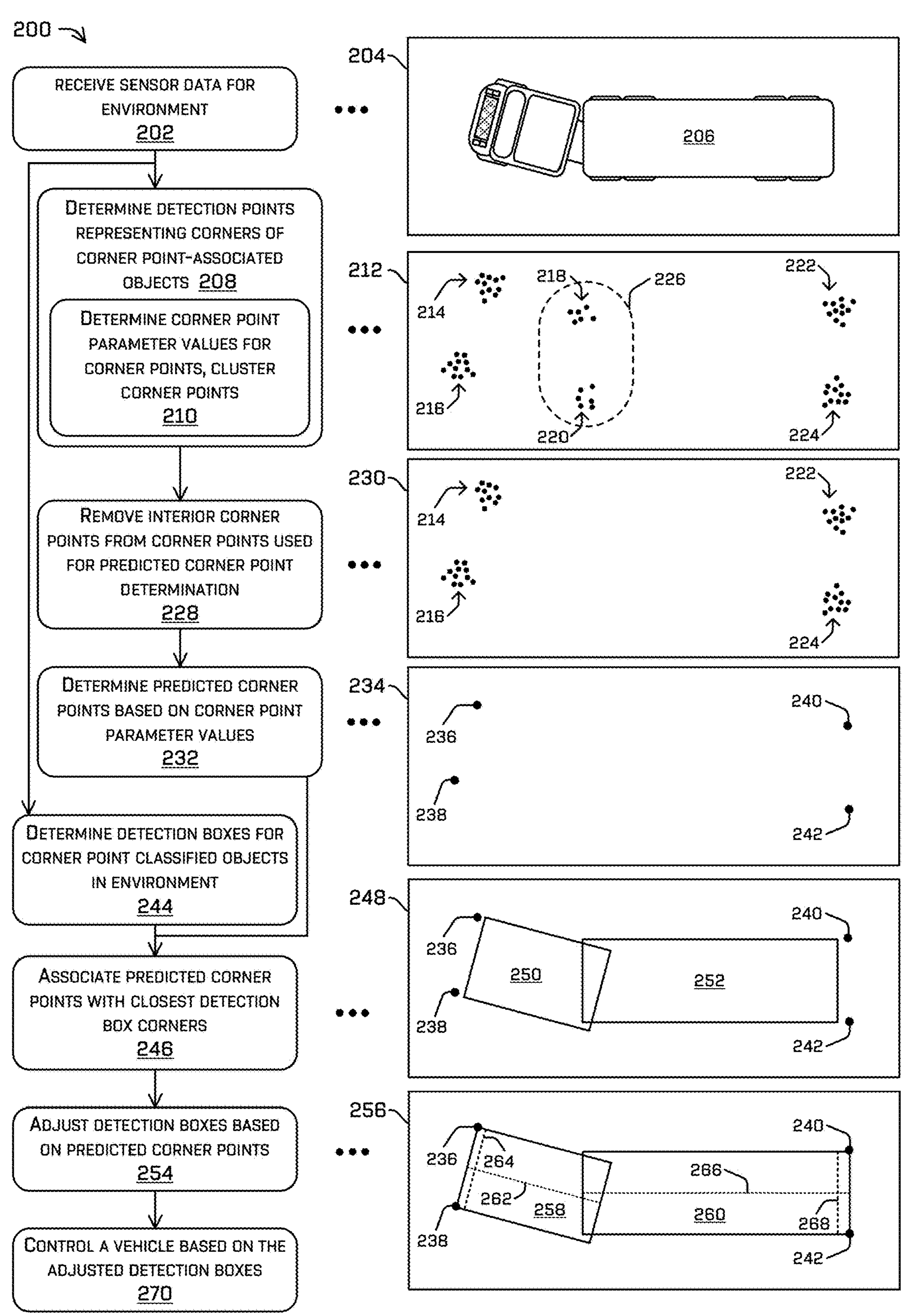
FIG. 2 a pictorial flow diagram of another example process for generating detection boxes using systems and methods for corner detections, in accordance with examples of the disclosure.

FIG. 2 is a pictorial flow diagram of an example process 200 for object detection box determination. In examples, one or more operations of the process 200 may be implemented by a vehicle computing system, such as by using one or more of the components and systems illustrated in FIGS. 3-5 and described below. For example, the one or more components and systems can include an object detection component 306 illustrated in FIG. 3 and/or one or more components associated therewith. Alternatively or additionally, the one or more components and systems can include an object detection component 414 illustrated in FIG. 4 and/or one or more components associated therewith. Alternatively or additionally, the one or more components and systems can include an object detection component 532 and/or an object detection component 552 illustrated in FIG. 5 and/or one or more components associated therewith. However, the process 100 is not limited to being performed by such components and systems, and the components and systems of FIGS. 3-5 are not limited to performing the process 200.

At operation 202, sensor data representing an environment in which a vehicle may be traveling may be received at a vehicle computing system or other computing system. As with other examples described herein, sensor data may include one or more types of sensor data associated with one or more types of sensor systems, including, but not limited to, vision data associated with a vision system, lidar data associated with a lidar system, radar data associated with a radar system, sonar data associated with a sonar system, etc. In various examples, the sensor data may include or be represented in a two-dimensional representation (e.g., image) of a portion of an environment determined based on sensor data and associated with a particular sensor perspective. In other examples, the sensor data may include or be represented in a three-dimensional data representation of a portion of an environment determined based on sensor data and associated with a particular sensor perspective.

An example 204 illustrates a top-down view of a portion of an environment that may be represented by sensor data such as that received at operation 202. In the portion of the environment represented in example 204, a vehicle 206 may represent a vehicle detected using such sensor data. The sensor data may be collected at a vehicle (not shown) that may be traveling through that portion of the environment (e.g., proximate to the vehicle 206). The vehicle collecting such sensor data may be equipped with a vehicle computing system that may include an object detection component as described herein. The vehicle 206 may be an articulated vehicle, such as a tractor-trailer.

At operation 208, the system (e.g., a vehicle computing system and/or an object detection component associated therewith) may determine detection points from among the sensor data and/or associated data received at operation 102 that may be associated with object corners. In examples, the object detection component may be configured to identify and/or classify individual points (e.g., pixels, voxels, points in a point cloud, etc.) as corner points (e.g., as points with a sufficient likelihood of being associated with a corner of an object). The object detection component may also be configured to identify and/or classify the individual points (e.g., pixels, voxels, points in a point cloud, etc.) as being associated with a corner point-associated object (e.g., truck, bus, articulated vehicle, other large object, etc.). The system may further be configured to determine one or more classification confidence values and/or other values associated with a corner point classifications. In various examples, such identification and/or classification may be performed by one or more machine-learned models configured at a vehicle computing system (e.g., as a component of an object detection component or object determination system) and trained to perform such operations, for example, as described herein.

At operation 210, which may be performed as part of and/or in parallel to operation 208, the system (e.g., a vehicle computing system and/or an object detection component associated therewith) may determine values for one or more corner point parameters associated with the corner points determined at operation 208. For example, the system may determine a vertical corner location parameter (e.g., front or rear) and/or a horizontal corner location parameter (e.g., left or right) for the individual corner points. In three-dimensional examples, the system may also, or instead, determine a height corner location parameter (e.g., top or bottom) for the individual corner points. The system may also determine a location coordinate parameters indicting a location in an area or space of the point.

Based on the corner point parameters, further at operation 210 the system may determine clusters of corner points. For example, the system may cluster corner points that are associated with the same vertical corner location parameter and have the same horizontal location parameter. In three-dimensional implementations, the system may further cluster corner points based that have the same height corner location parameter. As described herein, the system may filter out corner points from further corner point determination operations based on a total number of points in a cluster and/or other criteria. The system may further use a sufficiency of proximity determination in clustering to cluster point that are relatively close to one another.

An example 212 illustrates a top-down view of the portion of the environment represented in the example 204. In the example 212, using sensor data collected in the environment, the system may have determined various corner points 214, 216, 218, 220, 222, and 224. The system may have determined corner point parameters for these corner points and clustered these corner points (e.g., associated a particular cluster identifier with individual corner points in an associated cluster).

For example, the system may determine that the corner points 214 may each have a vertical corner location parameter of "front" and a horizontal corner location parameter of "right" (e.g., from the perspective of the vehicle capturing the sensor data on which the corner point determinations were made, which, in this example, may be behind the vehicle 206 of the example 204). The individual corner points 214 may also be associated with a corner point-associated object classification and/or otherwise labeled as a cluster associated with such an object type or classification. Thus, corner points having a vertical corner location parameter of "front" and a horizontal corner location parameter of "right" (corner points 224) may be readily identified as corner points in a same cluster.

Similarly, the system may have determined that the corner points 216 may each have a vertical corner location parameter of "front" and a horizontal corner location parameter of "left" and/or otherwise may be labeled as a cluster. Likewise, the system may have determined that the corner points 222 may each have a vertical corner location parameter of "rear" and a horizontal corner location parameter of "right" and/or otherwise may be labeled as a cluster. The system may have also determined that the corner points 224 may each have a vertical corner location parameter of "rear" and a horizontal corner location parameter of "left" and/or otherwise may be labeled as a cluster.

In this example, the system may also determine corner location parameters for the corner points 218 and 220. However, because these points may be interior points that are within or proximate to a joint area 226 that represents a likely overlap or proximity of two detection boxes that are parts of a same object, the particular parameters may vary. For example, while the system may have determined that the corner points 218 may each have a horizontal corner location parameter of "right," some of the corner points 218 may be determined to have a vertical corner location parameter of "front," while other of the corner points 218 may be determined to have a vertical corner location parameter of "rear." Similarly, the system may have determined that the corner points 220 may each have a horizontal corner location parameter of "left," but some of the corner points 220 may be determined to have a vertical corner location parameter of "front," while other of the corner points 220 may be determined to have a vertical corner location parameter of "rear." Such points in overlapping or proximate detection box portions for a same object may be removed from subsequent predicted corner point determinations as described herein.

For example, at operation 228, the system may ignore, filter, or otherwise remove, from predicted corner point consideration, interior corner points that are determined to be located within or proximate to portions of overlap or proximity of two (e.g., associated, for example, based on classification) detection boxes. Such interior corner points may have been output by a corner detection model as described herein despite such models being trained using training data that includes interior corner points. Therefore, to improve efficiency and reduce interior point processing, the system may evaluate the location parameters of corner points and compare these parameters to the area represented by a joint or for other interior point characteristics for this operation. Alternatively or additionally, the system may perform one or more other operations to determine and remove corner points associated with a joint or other overlapping or proximate portions of detection boxes. In some examples, a machine-learned model may be trained to remove such points from predicted corner point determinations.

An example 230 illustrates a top-down view of the portion of the environment represented in the previous examples of this figure. In the example 230, the system may have removed the corner point 218 and 220 shown in the example 212, leaving the determined corner points 214, 216, 222, and 224 for further processing in subsequent corner point determination operations.

At operation 232, the system may determine predicted corner points by averaging location parameters of the determined corner points in the same clusters. As described, simple averaging and/or weighted averaging of any form (e.g., based on classification confidence values) may be used to determine a location parameter for each dimension. Alternatively, one or more other techniques may be used to determine a location for a predicted detection box corner point based on the locations of potential predicted corner points.

An example 234 illustrates a top-down view of the portion of the environment represented in the previous examples of this figure. In the example 234, the system may have determined predicted corner point 236 based on the corner points 214, predicted corner point 238 based on the corner points 216, predicted corner point 240 based on the corner points 222, and predicted corner point 242 based on the corner points 224.

At operation 244 (which may be performed independently and/or in parallel with operations 208, 210, 228, and/or 232), the system (e.g., a vehicle computing system and/or an object detection component associated therewith) may determine object detection boxes for objects in the environment based on the data received at operation 202. Included in this operation may be a classification or other object type determination. For example, the system may be configured to determine that boxes are associated with particular vehicle types (e.g., buses, tractor-trailers, pedestrians, bicycles, motorcycles, etc.).

At operation 246, the determined predicted corner points of operation 232 may be associated with a detection box determined at operation 246. For example, the system may determine the nearest detection box to the location of individual determined predicted corner points and associate the points with the nearest corner of that detection box.

An example 248 illustrates a top-down view of the portion of the environment represented in the other examples described in regard to this figure. In the example 248, the system may have determined predicted corner points 236, 238, 240, and 242, based on averaging location parameters of the corner points 214, 216, 222, and 224, respectively, of the previous examples. Based on the locations of the predicted corner points 236, 238, 240, and 242 and the locations of the proximate detection boxes determined for the environment at operation 244, the system may have determined associated detection boxes. In this example, predicted corner points 236 and 238 may be associated with the detection box 250 and predicted corner points 240 and 242 may be associated with the detection box 252. As can be seen here, the locations of the predicted corner points 236, 238, 240, and 242 may not be at the edge of, or within, their associated detection boxes.

At operation 254, the system may adjust one or more detection boxes based on the determined predicted corner points. For example, the location parameters of the determined predicted corner points may differ from the location parameters of the corners of the associated detection box. Because the determined predicted corner points are likely to be more accurate than the determined corners of the detection box, the system may adjust the detection box to expand (or contract) in one or more dimensions to match the detection box corners to the locations of the corresponding predicted corner points. The system may adjust more than one corner of a detection box to retain the rectangular shape of the box, or the system may adjust the corners as needed, even if the resulting box is a non-rectangular polygon.

An example 256 illustrates a top-down view of the portion of the environment represented in the other examples described in regard to this figure. In the example 256, as described above, the system may have determined predicted corner points 236, 238, 240, and 242. Based on the locations of the predicted corner points 236 and 238, the system may have adjusted the detection box 250 of the previous example to determine an adjusted detection box 258. For example, the system may have expanded the detection box 250 vertically (e.g., along the y axis 262) to generate the adjusted detection box 258 that now has front corners meeting the locations of the predicted corner points 236 and 238. In this example, the front of the detection box 258 is in a different position than the front of the detection box 250, represented here as a front line 264.

Similarly, based on the locations of the predicted corner points 240 and 242, the system may have adjusted the detection box 252 of the previous examples to determine an adjusted detection box 260. Here, the system may have expanded the detection box 252 vertically (e.g., along the y axis 266) to generate the adjusted detection box 260 that now has rear corners meeting the locations of the predicted corner points 240 and 242. In this example, the rear of the detection box 260 is in a different position than the rear of the detection box 252, represented here as a rear line 268.

At operation 270, the vehicle computing system may use the adjusted detection boxes to control the vehicle. For example, the object detection component may output the adjusted detection boxes to a planning component or a trajectory determination component for use in determining a trajectory and further movement of the vehicle through the environment. The object detection component may further, or instead, output the adjusted detection box to a prediction component for use in predicting the motion of the object associated with the adjusted detection box. The object detection component may also, or instead, output the adjusted detection box to one or more other components for use in controlling the vehicle and/or performing other operations. In various examples, the output detection boxes associated with an articulated vehicle, such as the vehicle 206 described in these examples, may be output as two discrete and associated object detection boxes and/or may be output as a single polygonal detection box representing the area or space occupied by the articulated vehicle.

FIG. 3 is a block diagram of an example object determination system 300 according to various examples. The system 300 may be implemented at a vehicle (e.g., an autonomous vehicle) by a vehicle computing system and may include one or more of the components and systems illustrated in FIGS. 4 and 5 described below. Alternatively or additionally, the system 300 may be implemented at a machine-learned model training system. For example, one or more components and systems can include those associated with one or more of the one or more sensor systems 408 and 506, one or more of the perception components 412 and 522, one or more of the object detection components 414 and 532, and/or one or more of the planning components 418 and 524. In some examples, the one or more components of the system 300 may also, or instead, be implemented at a remote system in communication with a vehicle, such as the object detection model training component 554, the object detection component 552, the perception component 548 and/or the planning component 550 of the computing device(s) 542 illustrated in FIG. 5. In still other examples, one or more operations of the system 300 may be implemented as a combination of components at a remote system and a vehicle computing system. However, the system 300 is not limited to being performed by such components and systems, and the components and systems of FIGS. 4 and 5 are not limited to implementing the system 300.

The system 300 may include a vehicle computing system 302. Sensor data may be generated, determined, received, and/or provided by one or more sensor systems 304 configured at the vehicle computing system 302 to a perception component 318 that may also be configured at the vehicle computing system 302. The perception component 318 may include an object detection component 306. In various examples, such sensor data may be associated with data collected and/or generated by the one or more sensor systems 304 that may be configured on a vehicle that may be traveling through an environment. Such sensor data may include lidar data, radar data, sonar data, vision data, infrared data, ultrasonic data, time-of-flight data, etc. This sensor data may also, or instead, include any type of two-dimensional data and/or three-dimensional data that may be associated with an environment. For example, the sensor data generated by the one or more sensor systems 304 may include one or more images of one or more portions of an environment (e.g., based on any type of sensor data) that include pixels or other data units representing discrete portions of a two-dimensional area within the environment. The sensor data generated by the one or more sensor systems 304 may also, or instead, include three-dimensional data associated with an environment, such as a voxelized representation of the environment including individual voxels representing discrete portions of a three-dimensional space within the environment. Such sensor data may further include labels, labeling information, classifications, and/or classifying information that may be associated with two-dimensional data (e.g., pixels) and/or three-dimensional data (e.g., voxels). Such sensor data may include one or more multichannel data structures with individual channels representing data associated with a particular type of sensor or particular sensor system (e.g., vision, lidar, radar, sonar, time-of-flight, etc.) and/or one or more other types of data.

The object detection component 306 may include a classification component 308 that may be configured to determine one or more classifications for individual data units of the sensor data received from the one or more sensor systems 304. For example, the classification component 308 may identify and classify or label individual pixels, voxels, and/or other data units as corner points (e.g., general corner points, interior corner points, or exterior corner points), points associated with a detection box, points associated with an object type (e.g., corner point-associated objects), etc. The classification component 308 may determine classifications and/or labels for detection boxes and assign such classifications and/or labels to detection boxes and/or to the points associated with such detection boxes. In examples, a single such data unit may be associated with multiple labels and/or classifications. For example, a point labeled as a corner point may also be labeled as being associated with a particular object type and/or as being an interior or exterior corner point.

The object detection component 306 may include a detection box determination component 310 that may be configured to determine detection boxes based on sensor data and/or associate individual pixels, voxels, and/or other data units with one or more detection boxes. In examples, the detection box determination component 310 may determine extents of detection boxes and/or other detection box parameters.

The object detection component 306 may include a predicted corner point determination component 312 that may be configured to determine predicted corner points based on determined corner points (e.g., as determined by the classification component 308). In examples, the predicted corner point determination component 312 may determine locations for predicted corner points based on determined corner points (e.g., by using averaging operations applied to corner point location coordinates or other operations). In further examples, the predicted corner point determination component 312 may determine detection boxes associated with predicted corner points, while in other examples this function may be performed by one or more other components of the object detection component.

The object detection component 306 may include an adjusted object detection box determination component 314 that may be configured to determine adjusted detection boxes based on predicted corner points (e.g., as determined by the predicted corner point determination component 312). In examples, the adjusted object detection box determination component 314 may determine detection boxes associated with predicted corner points. In examples, the adjusted object detection box determination component 314 may also or instead, determine updated extents for detection boxes based on the corner locations represented at predicted corner points, modifying the detection boxes initially determined by, for example, the detection box determination component 310, and/or generating updated detection boxes to replace such initially determine detection boxes.

The perception component 318 of the vehicle computing system 302 may also, or instead, perform other perception operations, such as further detection and/or labeling operations, that may generate data for use in other component configured at the vehicle computing system 302.

The output of the object detection component 306 may include such updated detection boxes. This output may be provided to various other components of the vehicle computing system 302 for further operations that may, for example, be associated with controlling the vehicle. For example, the vehicle computing system 302 may provide the output of the object detection component 306 (e.g., updated detection boxes and associated data) to a prediction component 322 and/or a planning component 320 for vehicle and/or object trajectory and tracking and/or for vehicle route determination. Any one or more of such components may further interact with a mapping company 326 to perform such operations.

The vehicle computing system 302 may also, or instead, provide the output of the object detection component 306 (e.g., updated detection boxes and associated data) to top-down segmentation component 316 that may generate a top-down segmented representations of an environment (e.g., top-down images) that includes indications of the output adjusted detection boxes. For example, the top-down segmentation component 316 may use the two-dimensional image data in the output of the object detection component 306 (e.g., representing adjusted detection boxes) to determine segment data for a two-dimensional top-down representation of the environment. In some examples, the top-down segmentation component 316 may determine labels for segments in a top-down representation of the environment based on the output of the object detection component 306. In various examples, the top-down segmentation component 316 may represent such segments as connected cells in a top-down two-dimensional grid representation of the environment based, at least in part, on the output of the object detection component 306. This top-down segmented representation may be used by the prediction component 322, the planning component 320, and/or by one or more other components configured at the vehicle computing system 302 to more accurately determine vehicle trajectories, predict object trajectories, and/or plan vehicle routes, which in turn may increase the safety and efficiency of vehicle operation.

The output of the object detection component 306 may be provided to one or more other systems or components for use in other operations, including in combination with other types of data (e.g., using one or more data fusion operations with one or more other data representation of an environment). For example, the output of the object detection component 306 may be used to determine tracking data for objects in an environment and/or the vehicle itself. In various examples, a vehicle computing system 302 may use the output of the object detection component 306 to control a vehicle. For example, a vehicle computing system 302 may determine to control the vehicle around another vehicle represented by a detection box included in the output of the object detection component 306. In examples, one or more vehicle controls may be generated by one or more vehicle control components 324 based on a detection box included in the output of the object detection component 306.

The output of the object detection component 306 may also, or instead, be provided to one or more other systems or components as training data for training a machine-learned model to, for example, determine adjusted detection boxes for objects based on determined predicted corner points.

In various examples, a system may train a machine-learned model to perform object detection, corner point determination, and detection box generation using a training dataset that includes data representing detections of various types based on sensor data collected in an environment. For example, the system 300 may include an object detection model training system 328 that may be configured to train one or more machine-learned model to perform one or more functions of an object detection components, such as the object detection component 306. Such training may include the training processes described herein.

The object detection model training system 328 may include a machine learning model architecture 330 (e.g., that may include one or more neural networks of any type and/or any other machine learning model components) that may be configured to train an object detection component 306 to determine predicted corner points, corner point parameters and/or properties, object detection boxes, and perform other functions as described herein. For example, the machine learning model architecture 330 may be include a corner point determination training system 332 that may be configured to train one or more models or model components to determine corner points and/or predicted object detection box corner points.

The object detection model training system 328 may use training data 334 to perform model training operations. The training data 334 may include one or more multichannel data structures where individual channels of the data structure may represent data associated with a particular type of sensor or particular sensor system (e.g., vision, lidar, radar, sonar, time-of-flight, etc.). In examples, individual channels of the data structure may also, or instead, represent data associated with a particular individual sensors or sensor systems (e.g., that may be used in a fusion process as described herein). In still further examples, individual channels of the data structure may also, or instead, represent data associated with classifications and/or labels, such as corner point classifications, detection box classifications, interior/exterior point classifications, etc. In additional examples, individual channels of the data structure may also, or instead, represent corner point parameters, such as vertical corner location parameter values, horizontal corner location parameter values, height corner location parameter values, associated detection box parameter values, cluster identifier parameter values, associated joint parameter values, etc. Examples of processing multichannel data structures and/or data associated with multiple sensors and other data sources to determine environmental information are provided in U.S. patent application Ser. No. 16/941,815, filed Jul. 29, 2020, now U.S. Pat. No. 11,361,196, issued Jun. 14, 2022, entitled "Object Height Estimation from Monocular Images," and U.S. patent application Ser. No. 17/520,496, filed Nov. 5, 2021, entitled "Sensor Perturbation," the entireties of both of which are incorporated herein by reference for all purposes.

The resulting trained object detection component may be provided to one or more vehicle computing systems for use in controlling a vehicle through an environment and/or for other vehicle-related operations. For example, the object detection model training system 328 may train the object detection component 306 and provide the object detection component 306 to the vehicle computing system 302 for use in a vehicle (e.g., an autonomous vehicle).

Figure 4A:
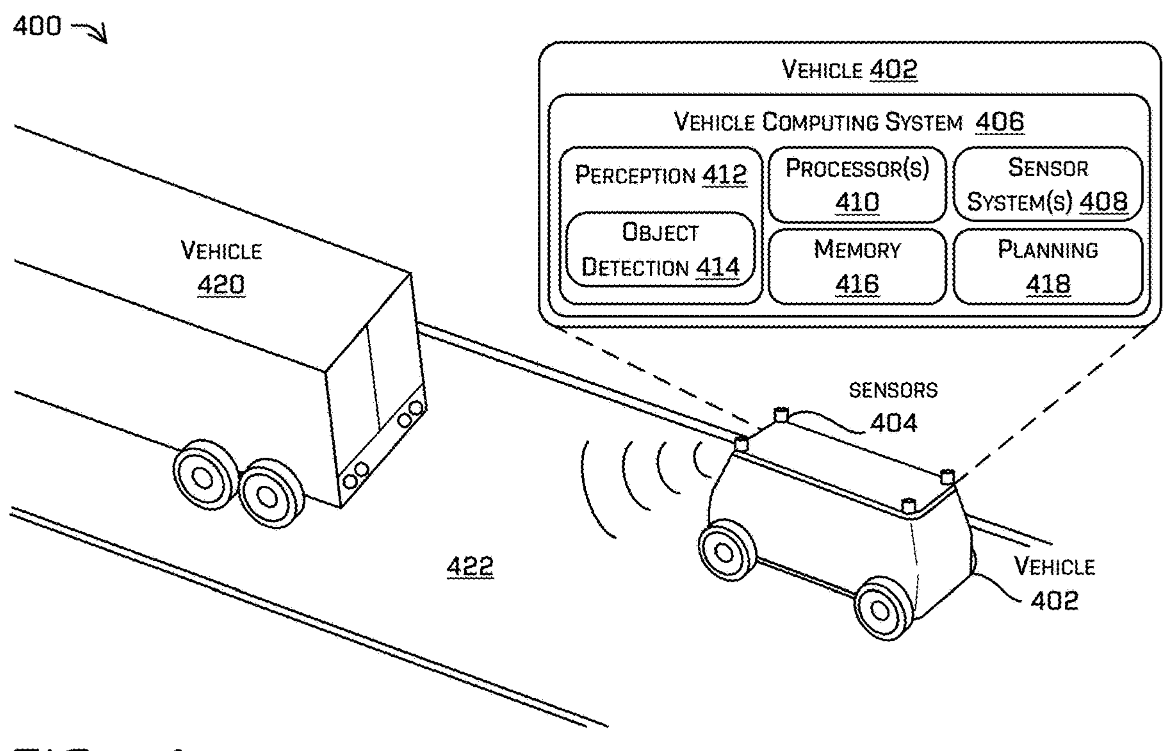
FIG. 4A is a diagram of an example environment in which a vehicle may encounter another vehicle, in accordance with examples of the disclosure.
Figure 5:
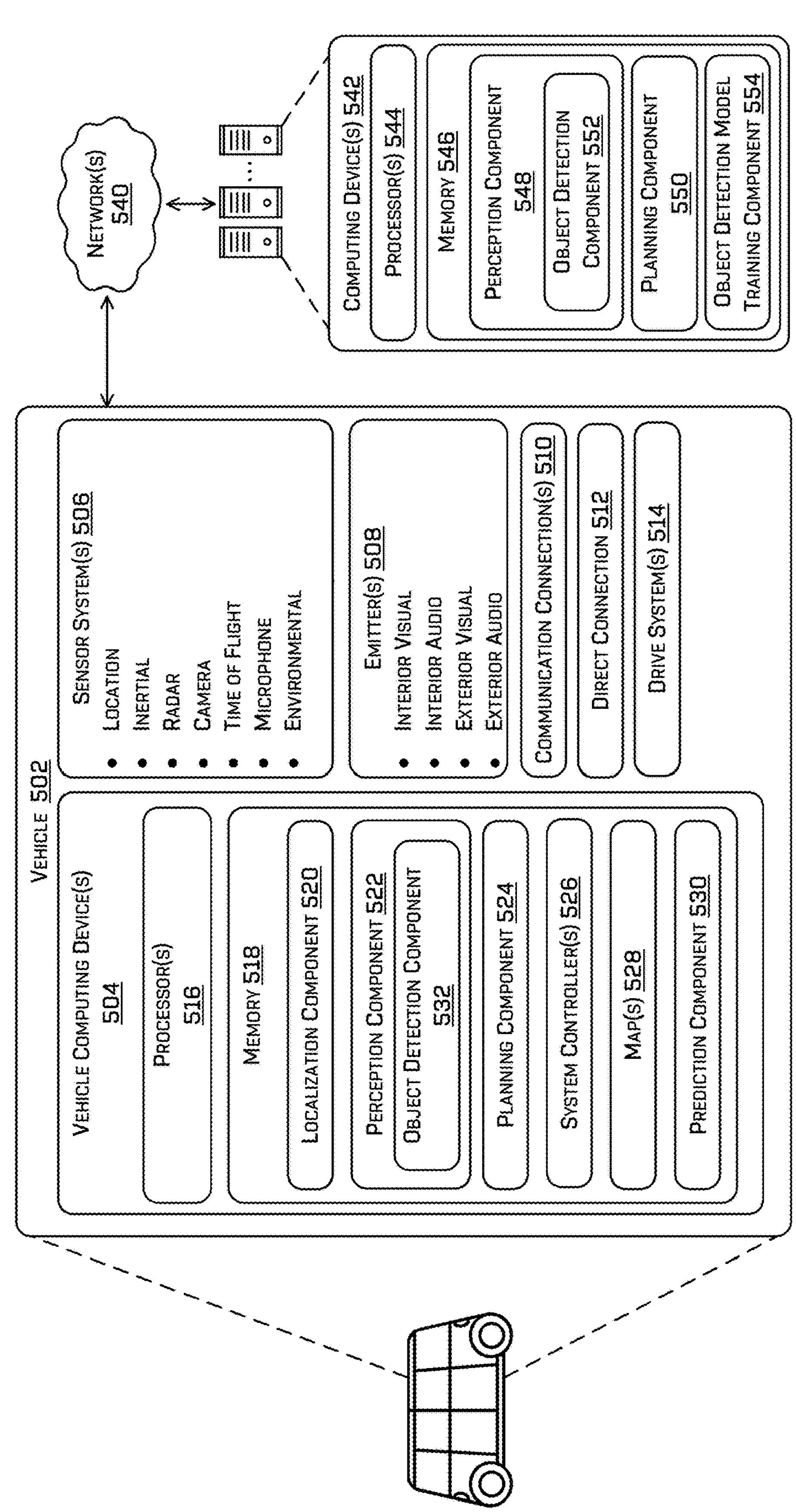
FIG. 5 is a block diagram of an example system for implementing the techniques described herein.

FIG. 4A is a perspective view of an example environment 400 in which a vehicle 402 may be traveling. The vehicle 402 may be configured with a vehicle computing system 406 that may include various components configured to perform one or more of the operations described herein. The vehicle 402 may also be configured with one or more sensors 404 that may include any one or more sensor of any type (e.g., lidar, radar, sonar, vision, time-of-flight, ultrasonic, infrared, etc.). The sensors 404 may be controlled by or otherwise associated with one or more sensor systems 408 that may interact with the vehicle computing system 406 and may generate and/or process sensor data based on sensor emissions and/or detections performed by the sensors 404.

The vehicle computing system 406 may also be configured with a perception component 412 that may receive sensor data from the sensor system(s) 406. The perception component 412 may be configured with an object detection component 414 that may be configured to perform any one or more of the operations described herein, including any of the corner point determination operations and adjusted detection box determination operations. The object detection component 414 and/or the perception component 412 may perform detection and/or labeling operations using sensor data. In some examples, the perception component 412 and the object detection component 414 may be combined into a single component or system and/or otherwise interact to perform the disclosed operations. The vehicle computing system 406 that may include one or more processors 410, a memory 416, and a planning component 418, any one or more of which may be used to perform, or in conjunction with the performance of, one or more of the operations described herein.

The environment 400 may include a road 422 on which the vehicle 402 may be traveling and another vehicle 420 also traveling on the road 422. The sensor system(s) 408 may collect data from the environment 400 (e.g., by receiving or otherwise sensing reflected and/or emitted electromagnetic waves in the environment 400) and generate sensor data that the sensor system(s) 408 may provide to the object detection component 414. This sensor data may take the form of two-dimensional data and/or three-dimensional data representing and/or otherwise associated with the environment 400. In examples, the sensor data may include two-dimensional images of portions of the environment from a sensor perspective.

The object detection component 414 may include one or more machine-learned models that may have been trained to perform corner point determination and adjusted object detection box generation functions, for example as disclosed herein. The object detection component 414 may perform classification and labeling operations as described herein to determine one or more classifications for the various points determined in the environment 400, including for corner points and points that may be associated with corner point-associated object types. For example, the object detection component 414 may detect points representing the vehicle 420 and determine one or more labels for such detections, such as labels associating such points with a corner of a vehicle of the type of the vehicle 420 and/or with other corner point labels and/or classifications. The object detection component 414 may further determine clusters and corner point parameters for such corner points as described herein.

Figure 4B:
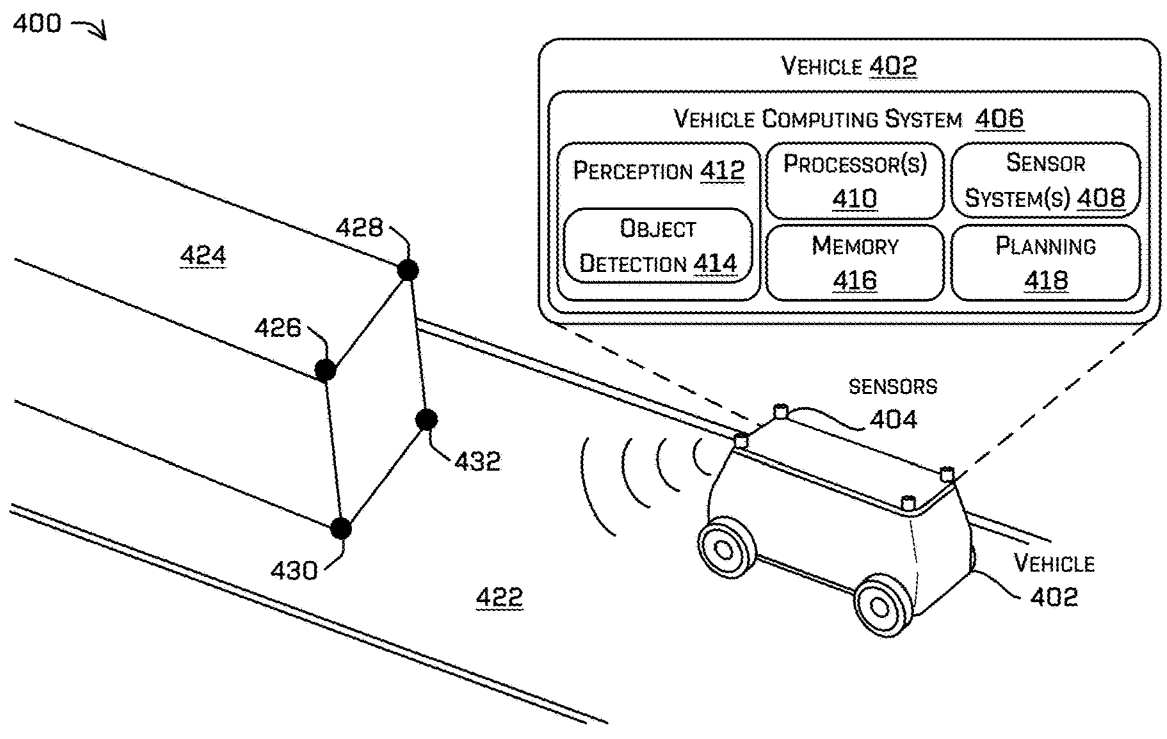
FIG. 4B is a diagram of the example environment of FIG. 4A in which the vehicle may determine a detection representation of the other vehicle in the environment for purposes of navigating the vehicle through the environment, in accordance with examples of the disclosure.

Using such corner point parameters for clustered corner points and one or more detection boxes determined for the vehicle 420 (including, in examples, one or more joints), the object detection component 414 may determine predicted corner points for detection box(es) representing the vehicle 420. Referring now to FIG. 4B providing another perspective view of the example environment 400, the object detection component 414 may have determined predicted corner points 426, 426, 430, and 432 for a three-dimensional detection box 424 representing the vehicle 420 of FIG. 4A. These predicted corner points may have, or be based on, corner point location parameters reflecting their locations relative to the detection box 424.

For example, predicted corner point 426 may have, or may be based on corner points having, a vertical corner location parameter of "rear," a horizontal corner location parameter of "left," and a height corner location parameter of "top," indicating a location of the predicted corner point 426 from the perspective of the vehicle 402. Likewise, predicted corner point 428 may have, or may be based on corner points having, a vertical corner location parameter of "rear," a horizontal corner location parameter of "right," and a height corner location parameter of "top," indicating a location of the predicted corner point 428 from the perspective of the vehicle 402. Predicted corner point 430 may have, or may be based on corner points having, a vertical corner location parameter of "rear," a horizontal corner location parameter of "left," and a height corner location parameter of "bottom," indicating a location of the predicted corner point 430 from the perspective of the vehicle 402. Predicted corner point 432 may have, or may be based on corner points having, a vertical corner location parameter of "rear," a horizontal corner location parameter of "right," and a height corner location parameter of "bottom," indicating a location of the predicted corner point 432 from the perspective of the vehicle 402.

The object detection component 414 may have determined the detection box 424 based at least in part on the predicted corner points 426, 426, 430, and 432. For example, as described herein, the object detection component 414 may have adjusted an initial detection box representing the vehicle 420 to have corners at the locations of the predicted corner points 426, 426, 430, and 432. Such adjustments may have been in any of the three dimensions represented by the detection box 424.

The object detection component 414 may provide this detection box 424 as output to one or more other components of the vehicle computing system 406 for vehicle control and/or other operations. For example, the vehicle computing system 406 may use the planning component 418 to determine a trajectory for the vehicle 402 based on the output detection box 424 determined by the object detection component 414. For example, the planning component 418 may generate a trajectory that slows the vehicle 402 before encountering the vehicle 420 based on the extents of the detection box 424 as determined by the object detection component 414. Because the extents of the detection box 424 may be more accurate due to the improved corner point determination operations executed by the object detection component 414, the vehicle computing system 406 may be able to more safely and comfortably operate the vehicle 402 in proximity of the vehicle 420.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle;

however, the vehicle 502 could be any other type of vehicle. In the illustrated example, the memory 518 of the vehicle computing device 504 stores a localization component 520, a perception component 522, a planning component 524, one or more system controllers 526, one or more maps 528, and/or a prediction component 530. The perception component 522 may include an object detection component 532 that may be configured to perform any one or more of the corner point determination and/or adjusted detection box determination operations described herein. In examples, the perception component 522 and the object detection component 532 may be integrated into a single component or system, while in other examples the perception component 522 and the object detection component 532 may be discretely implemented components. Though depicted in FIG. 5 as residing in memory 518 for illustrative purposes, it is contemplated that any one or more of the localization component 520, the perception component 522, the planning component 524, the one or more system controllers 526, the one or more maps 528, the prediction component 530, and/or the object detection component 532 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, object detection box and corner point determination and labeling and machine-learned model training operations as described herein. For example, the perception component 522 may include functionality to analyze sensor data to determine whether to label pixels in images as corner points, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, large vehicle, articulated vehicle, unknown).

In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as voxel data structures and two-dimensional sensor data, to generate processed sensor data, which may take the form of two-dimensional images in some examples. In some examples, characteristics associated with an entity or object can include, but are not limited to, an x-position (global, local, and/or relative position), a y-position (global, local, and/or relative position), a z-position (global, local, and/or relative position), an orientation (e.g., a roll, pitch, yaw), an entity type (e.g., a classification), a velocity of the entity, an acceleration of the entity, an extent of the entity (size and/or dimensions), a non-impeding or impeding object designation, intensity, etc. Such entity characteristics may be represented in a data structure (e.g., a multichannel data structure, a two-dimensional grid of cells containing data, a two-dimensional representation of a portion of an environment from a sensor perspective, a two-dimensional image, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In some examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment and can be loaded into working memory as needed. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior. In some examples, the prediction component 530 can use data and/or data structures based on return pulses as described herein to generate one or more predicted trajectories for various mobile objects in an environment. In some examples, the prediction component 530 may be a sub-component of perception component 522.

In some instances, aspects of some or all of the components discussed herein can include any models, algorithms, and/or machine learning algorithms. For example, in some instances, the components in the memory 518 (and/or the memory 546, discussed below) can be implemented as a neural network. For instance, the memory 518 may include a deep tracking network that may be configured with a convolutional neural network (CNN) that may include one or more convolution/deconvolution layers. Such a CNN may be a component of and/or interact with the object detection component 532.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 540, to the one or more computing device(s) 542 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data, including data described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G. 6G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., images, labeled images) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing a planning component 550 and/or a perception component 548, that may be configured to perform one or more of the corner point determination and adjusted detection box determination operations described herein. In examples, the perception component 548 may include an object detection component 552. In some instances, the perception component 548 can substantially correspond to the perception component 522 and/or the object detection component 532 and can include substantially similar functionality. In some instances, the object detection component 552 can substantially correspond to the object detection component 532 and can include substantially similar functionality. In some instances, the planning component 550 can substantially correspond to the planning component 524 and can include substantially similar functionality. The memory 546 may also store an object detection model training component 554 that may be configured to perform one or more of the object detection operations and/or machine-learned model training operations described herein.

The processor(s) 516 of the vehicle 502 and the processor (s) 544 of the computing device(s) 542 can be any suitable one or more processors capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement or otherwise cause the techniques and operations described herein and the functions attributed to the various disclosed systems to be performed. In various implementations, the memory 518 and 546 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

The following paragraphs describe various examples. Any of the examples in this section may be used with any other of the examples in this section and/or any of the other examples or embodiments described herein.

A: A system comprising one or more processors; and one or more non-transitory computer-readable media storing instructions executable by the one or more processors, wherein the instructions, when executed, cause the system to perform operations comprising receiving sensor data associated with a vehicle traversing an environment; determining, based at least in part on the sensor data, a plurality of corner points associated with a corner in the environment and associated with an object type; determining, based at least in part on locations of the plurality of corner points, a predicted corner point location; determining, based at least in part on the predicted corner point location, a detection box representing an object of the object type; modifying, based at least in part on the predicted corner point location, at least one extent parameter of the detection box to determine an adjusted detection box representing the object; and controlling the vehicle based at least in part on the adjusted detection box.

B: The system of paragraph A, wherein determining the predicted corner point location comprises averaging location parameters associated with the plurality of corner points to determine a location parameter of the predicted corner point location.

C: The system of paragraph A or B, wherein determining the plurality of corner points comprises determining, based at least in part on the sensor data, a second plurality of corner points; determining corner location parameters for individual corner points of the second plurality of corner points; and determining, as the plurality of corner points, a subset of the second plurality of corner points having a same corner location parameter.

D: The system of paragraph C, wherein the same corner location parameter comprises one of a vertical corner location parameter, a horizontal corner location parameter, or a height corner location parameter.

E: The system of any of paragraphs A-D, wherein modifying the at least one extent parameter of the detection box to determine the adjusted detection box comprises modifying a first location parameter representing a location a corner of the detection box to represent a second location parameter of the predicted corner point location.

F: The system of any of paragraphs A-E, wherein determining the plurality of corner points comprises determining, based at least in part on the sensor data, a second plurality of corner points; determining a first subset of the second plurality of corner points that are interior corner points associated with an articulated vehicle object type; and determining, as the plurality of corner points, a second subset of the second plurality of corner points that excludes the first subset of the second plurality of corner points.

G: A method comprising receiving sensor data associated with a vehicle traversing an environment; determining, based at least in part on the sensor data, a predicted corner point; modifying, based at least in part on the predicted corner point, a detection box representing an object in the environment; and controlling the vehicle based at least in part on the detection box.

H: The method of paragraph G, further comprising determining, based at least in part on the sensor data, a second predicted corner point; modifying, based at least in part on the second predicted corner point, a second detection box representing the object; and controlling the vehicle further based at least in part on the second detection box.

I: The method of paragraph G or H, wherein determining the predicted corner point is further based at least in part on determining that a corner point classification confidence value for the predicted corner point meets or exceeds a threshold.

J: The method of any of paragraphs G-I, wherein determining the predicted corner point comprises determining that the predicted corner point is associated with one or more exterior corner points associated with an articulated vehicle object type.

K: The method of any of paragraphs G-J, wherein determining the predicted corner point comprises determining, based at least in part on the sensor data, a classification of an object associated with the predicted corner point; and modifying, further based at least in part on the classification, the detection box.

L: The method of any of paragraphs G-K, wherein controlling the vehicle comprises determining a predicted trajectory for the object based at least in part on the detection box; and controlling the vehicle based at least in part on the predicted trajectory.

M: The method of any of paragraphs G-L, wherein controlling the vehicle comprises determining a vehicle trajectory based at least in part on the detection box; and controlling the vehicle using the vehicle trajectory.

N: The method of any of paragraphs G-M, wherein the predicted corner point is associated with a corner location parameter representing a relative location of the predicted corner point from a vehicle perspective.

O: One or more non-transitory computer-readable media storing instructions that, when executed by one or more processors, perform operations comprising receiving environmental data associated with a vehicle traversing an environment; determining, based at least in part on the environmental data, a predicted corner point; refining, based at least in part on the predicted corner point, a detection box representing an object in the environment; and determining a vehicle control based at least in part on the detection box.

P: The one or more non-transitory computer-readable media of paragraph O, wherein determining the predicted corner point comprises determining a plurality of corner points associated with a same relative corner location parameter; and determining the predicted corner point from among the plurality of corner points.

Q: The one or more non-transitory computer-readable media of paragraph P, wherein the same relative corner location parameter comprises one of a vertical corner location parameter, a horizontal corner location parameter, or a height corner location parameter.

R: The one or more non-transitory computer-readable media of any of paragraphs O-Q, wherein refining the detection box comprises modifying, based at least in part on the predicted corner point, a first extent of the detection box.

S: The one or more non-transitory computer-readable media of paragraph R, wherein refining the detection box comprises maintaining a second extent of the detection box.

T: The one or more non-transitory computer-readable media of any of paragraphs O-S, wherein determining a vehicle control comprises determining a top-down image of the environment comprising the detection box; and determining the vehicle control based at least in part on the top-down image.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving sensor data associated with a vehicle traversing an environment;

determining a predicted corner point location by:

determining based at least in part on the sensor data, a plurality of corner points associated with a corner in the environment and associated with a corner point classification; and determining, based at least in part on locations of the plurality of corner points, the predicted corner point location;

determining, based at least in part on the sensor data and independently from determining the predicted corner point location, a detection box representing an object associated with an object classification distinct from the corner point classification;

modifying, based at least in part on the predicted corner point location, at least one extent parameter of the detection box by associating a corner point of the detection box with the predicted corner point location to determine an adjusted detection box representing the object; and controlling the vehicle based at least in part on the adjusted detection box.

2. The system of claim 1, wherein determining the predicted corner point location comprises averaging location parameters associated with the plurality of corner points to determine a location parameter of the predicted corner point location.

3. The system of claim 1, wherein determining the plurality of corner points comprises:

determining, based at least in part on the sensor data, a second plurality of corner points;

determining corner location parameters for individual corner points of the second plurality of corner points; and determining, as the plurality of corner points, a subset of the second plurality of corner points having a same corner location parameter.

4. The system of claim 3, wherein the same corner location parameter comprises one of:

a vertical corner location parameter, a horizontal corner location parameter, or a height corner location parameter.

5. The system of claim 1, wherein modifying the at least one extent parameter of the detection box to determine the adjusted detection box comprises modifying a first location parameter representing a location a corner of the detection box to represent a second location parameter of the predicted corner point location.

6. The system of claim 1, wherein determining the plurality of corner points comprises:

determining, based at least in part on the sensor data, a second plurality of corner points;

determining that the second plurality of corner points are interior corner points associated with an articulated vehicle object type; and excluding the second plurality of corner points.

7. A method comprising:

receiving sensor data associated with a vehicle traversing an environment;

determining, based at least in part on the sensor data and a plurality of corner points determined in the environment, a predicted corner point;

determining, based at least in part on the sensor data and independently from determining the predicted corner point, a detection box representing an object in the environment;

modifying, based at least in part on the predicted corner point, the detection box; and controlling the vehicle based at least in part on the detection box.

8. The method of claim 7, further comprising:

determining, based at least in part on the sensor data, a second predicted corner point;

modifying, based at least in part on the second predicted corner point, a second detection box representing the object; and controlling the vehicle further based at least in part on the second detection box.

9. The method of claim 7, wherein determining the predicted corner point is further based at least in part on determining that a corner point classification confidence value for the predicted corner point meets or exceeds a threshold.

10. The method of claim 7, wherein determining the predicted corner point comprises determining that the predicted corner point is associated with one or more exterior corner points associated with an articulated vehicle object type.

11. The method of claim 7, wherein determining the predicted corner point comprises:

determining the plurality of corner points are associated with a corner point classification;

determining, based at least in part on the sensor data, a classification of an object associated with the predicted corner point, wherein the classification of the object is distinct from the corner point classification; and modifying, further based at least in part on the classification of the object, the detection box.

12. The method of claim 7, wherein controlling the vehicle comprises:

determining a predicted trajectory for the object based at least in part on the detection box; and controlling the vehicle based at least in part on the predicted trajectory.

13. The method of claim 7, wherein controlling the vehicle comprises:

determining a trajectory for the vehicle based at least in part on the detection box; and controlling the vehicle using the trajectory.

14. The method of claim 7, wherein:

determining the predicted corner point based at least in part on the sensor data comprises determining the predicted corner point based at least in part on a first subset of the sensor data associated with a first sensor type; and determining the detection box based at least in part on the sensor data comprises determining the detection box based at least in part on a second subset of the sensor data associated with a second sensor type that is distinct from the first sensor type.

15. One or more non-transitory computer-readable media storing instructions that, when executed by one or more processors, perform operations comprising:

receiving environmental data associated with a vehicle traversing an environment;

determining, based at least in part on the environmental data and a plurality of corner points determined in the environment, a predicted corner point;

determining, based at least in part on the environmental data and independently from determining the predicted corner point, a detection box representing an object in the environment;

refining, based at least in part on the predicted corner point, the detection box; and determining a vehicle control based at least in part on the detection box.

16. The one or more non-transitory computer-readable media of claim 15, wherein determining the predicted corner point comprises:

determining that the plurality of corner points are associated with a same relative corner location parameter; and determining the predicted corner point from among the plurality of corner points.

17. The one or more non-transitory computer-readable media of claim 16, wherein the same relative corner location parameter comprises one of:

a vertical corner location parameter, a horizontal corner location parameter, or a height corner location parameter.

18. The one or more non-transitory computer-readable media of claim 15, wherein refining the detection box comprises modifying, based at least in part on the predicted corner point, a first extent of the detection box.

19. The one or more non-transitory computer-readable media of claim 18, wherein determining the detection box comprises maintaining a second extent of the detection box.

20. The one or more non-transitory computer-readable media of claim 15, wherein determining the vehicle control comprises:

determining a top-down image of the environment comprising the detection box; and determining the vehicle control based at least in part on the top-down image.

* * * * *